United States Patent [19]

Humphrey

[11] 4,368,396

[45] Jan. 11, 1983

[54] RECIPROCATING ELECTRIC MOTOR WITH PERMANENT MAGNETS

[76] Inventor: James A. Humphrey, P.O. Box 295, Shelbyville, Ky. 40065

[21] Appl. No.: 208,807

[22] Filed: Nov. 20, 1980

[51] Int. Cl.³ .......................................... H02K 33/18
[52] U.S. Cl. ...................................... 310/27; 310/34; 310/35
[58] Field of Search .................... 310/23, 24, 39, 35, 310/27, 13; 417/416, 417

[56] References Cited

U.S. PATENT DOCUMENTS

| 2,328,337 | 8/1943 | Hanchock | 310/27 |
| 3,606,595 | 9/1971 | Takamizawa | 310/30 X |
| 3,878,412 | 4/1975 | Kurpanek | 310/34 X |
| 4,161,666 | 7/1979 | Bacsanyi et al. | 310/27 |
| 4,187,440 | 2/1980 | Ulmer | 310/34 X |

Primary Examiner—Donovan F. Duggan
Attorney, Agent, or Firm—Richard L. Caslin

[57] ABSTRACT

A reciprocating electric motor is shown having a sliding electromagnet aligned between a pair of spaced permanent magnets, where the facing poles of the permanent magnets are of the same polarity, and electrical circuit means is provided for energizing the electromagnet with alternate current flows to create alternate polarities of the electromagnetic field surrounding the electromagnet, whereby at any time there is a strong magnetic field attraction force between the electromagnet and one of the permanent magnets, while there is a strong magnetic field repulsion force between the electromagnet and the other permanent magnet. An electrical switching means is operated by the position of the electromagnet at each end of its reciprocating stroke for reversing the flow of current within the electromagnet and the polarity of the opposite ends of the electromagnet so as to reverse the direction of sliding movement of the electromagnet once it arrives at each end of its stroke. A driven means, such as a pump, is joined to the electromagnet for producing an energy force for driving a turbine, as in an electrically operated vehicle.

14 Claims, 5 Drawing Figures

RECIPROCATING ELECTRIC MOTOR WITH PERMANENT MAGNETS

BACKGROUND OF THE INVENTION

1. Field of the Invention

This invention relates to electric motors, and particularly to reciprocating electric motors having permanent magnets with a reciprocating electromagnet cooperating with the permanent magnets.

2. Description of the Prior Art

Reciprocating electric motors have been known in the past. The Cobe U.S. Pat. No. 1,804,375 describes a reciprocating hermetically sealed compressor for use with a refrigerator or an air conditioner. One feature of this compressor is that it is hermetically sealed to prevent leakage of the refrigerant. Hence, the are no moving parts extending to the outside of the compressor housing, and this vastly simplifies the bearing packing problems. In this Cobe compressor, there is a central reciprocating piston having a pair of aligned piston rods projecting in opposite directions from each end thereof. A fixed electromagnet is positioned at each end of the compressor so as to cause the central piston to reciprocate. In order that the electromagnets may be alternately energized and de-energized to reciprocate the central piston within the cylinder, there is an automatically operated switch that is adapted to alternately make and break the circuit leading from the battery.

The Reutter U.S. Pat. No. 3,103,603 describes an AC synchronous reciprocating motor comprising an axially movable armature inside a field magnet fed with alternating current and subjected to the action of elastic drawback forces. The motor has a field magnet that includes two annular magnets made of ferrite having axial magnetization and between which is coaxially disposed the energizing coil that is fed with alternating current. The polarity of the magnets is symmetrical with respect to the transverse median plane, so that the flux reverses in the above-mentioned armature when it moves from one side to the other of the transverse median plane. There is a permanent magnet positioned at each end of the field magnet. Moreover, there is a coil formed as part of the field magnet between the two permanent magnets. One use described for this Reutter motor is that it actuates a fuel oil pump and an air-pump, both serving to feed a fuel oil burner.

The Olson et al U.S. Pat. No. 3,135,880 describes a linear motion electromagnetic motor wherein the armature may be positioned at any selected point within the limits of its stroke by means of an external control. This motor allows the armature to be positioned at a continuous infinite number of null points along the length of its stroke by means of a remote setting. This Olson et al motor may employ either direct or alternating current. This motor has a U-shaped core made of ferromagnetic material having two parallel legs joined at one end by a central segment to form two parallel deflection coils. Slideably mounted between the two deflection coils is an armature comprising a permanent magnet oriented so that the flux lines emerging from its ends cut the conductors of each coil at right angles. The armature is attached to one end of a connecting rod, and the free end of this connecting rod is provided with a coupling to which the motor is connected, such as a pump or the like.

The Lovell U.S. Pat. No.3,162,134 describes an electromagnetic pump having a central reciprocating piston that is controlled by a pair of electromagnets which surround the piston. It is noted that the energizing circuit can be powered from either an AC or a DC source, and that this piston pump or compressor is hermetically sealed.

The Drye U.S. Pat. No. 3,681,629 describes a reciprocating electric motor that has an armature shaft that is acted upon lengthwise by a moving magnetic field produced by a field device having stationary field part comprising windings interposed between sheet metal discs that are disposed around the armature shaft. A tubular member is rigidly secured over the field device. Means are associated with the armature shaft to enclose therein two liquid-filled hermetic enclosures through which the shaft extends, and which are connected by a limited-delivery duct so that the volumes of the enclosures vary in inverse proportion and by the same amount for a movement of the shaft in either direction.

OBJECTS OF THE PRESENT INVENTION

The principal object of the present invention is to provide an electric motor with a reciprocating electromagnet that is positioned between a pair of spaced permanent magnets, where the permanent magnets are adjustably mounted so that they serve to control the strength of the magnetic field on the electromagnet and thereby the speed of reciprocation.

A further object of the present invention is to provide a reciprocating drive motor of the class described where the permanent magnets are piston shaped and operate within hydraulic cylinders, whereby hydraulic fluid under pressure is present in each cylinder in varying amounts so as to force the permanent magnets into variable positions, thereby controlling the speed of reciprocation of the electromagnet.

A further object of the present invention is to provide a reciprocating drive motor whereby a double-acting pump is associated with the reciprocating electromagnet for producing work.

A further object of the present invention is to provide a reciprocating drive motor with electrical switching means that is operated by the position of the electromagnet at each end of its stroke for reversing the flow of current within the electromagnet so as to reverse the direction of sliding movement of the electromagnet.

A further object of the present invention is to provide a reciprocating drive motor having a sliding electromagnet that is joined to a connecting rod between a pair of double-acting pistons in a pump mechanism.

A still further object of the present invention is to provide a reciprocating drive motor of the class described wherein a double-acting piston pump is integrated within the motor housing, with a piston mounted on each end of the electromagnet and fitted within an operating cylinder having inlet and discharge valve means associated with the cylinders for controlling the flow of a working fluid therein.

SUMMARY OF THE INVENTION

The present invention provides a reciprocating drive motor having a housing with guide means for supporting a movable electromagnet for reciprocating motion. A pair of spaced permanent magnets are aligned with the electromagnet for applying an alternate attraction and repulsion force to the electromagnet dependent upon the direction of electrical current flow through the coil of the electromagnet, where the electrical current flow is reversed as the electromagnet reaches the end of its stroke so as to reverse the polarity of the electromagnet and thereby reverse the magnetic field forces between the electromagnet and the pair of permanent magnets so as to reverse the direction of movement of the electromagnet and produce the reciprocating motion of the electromagnet.

BRIEF DESCRIPTION OF THE DRAWINGS

This invention will be better understood from the following description taken in conjunction with the accompanying drawings and its scope will be pointed out in the appended claims.

FIG. 4 is a transverse, cross-sectional, elevational view of the second modificatiion of this invention, taken on the line 4—4 of FIG. 3.

FIG. 5 is a schematic circuit diagram for the reciprocating electromagnet of both FIGS. 1 and 3.

DESCRIPTION OF THE PREFERRED EMBODIMENTS

Figure 1:
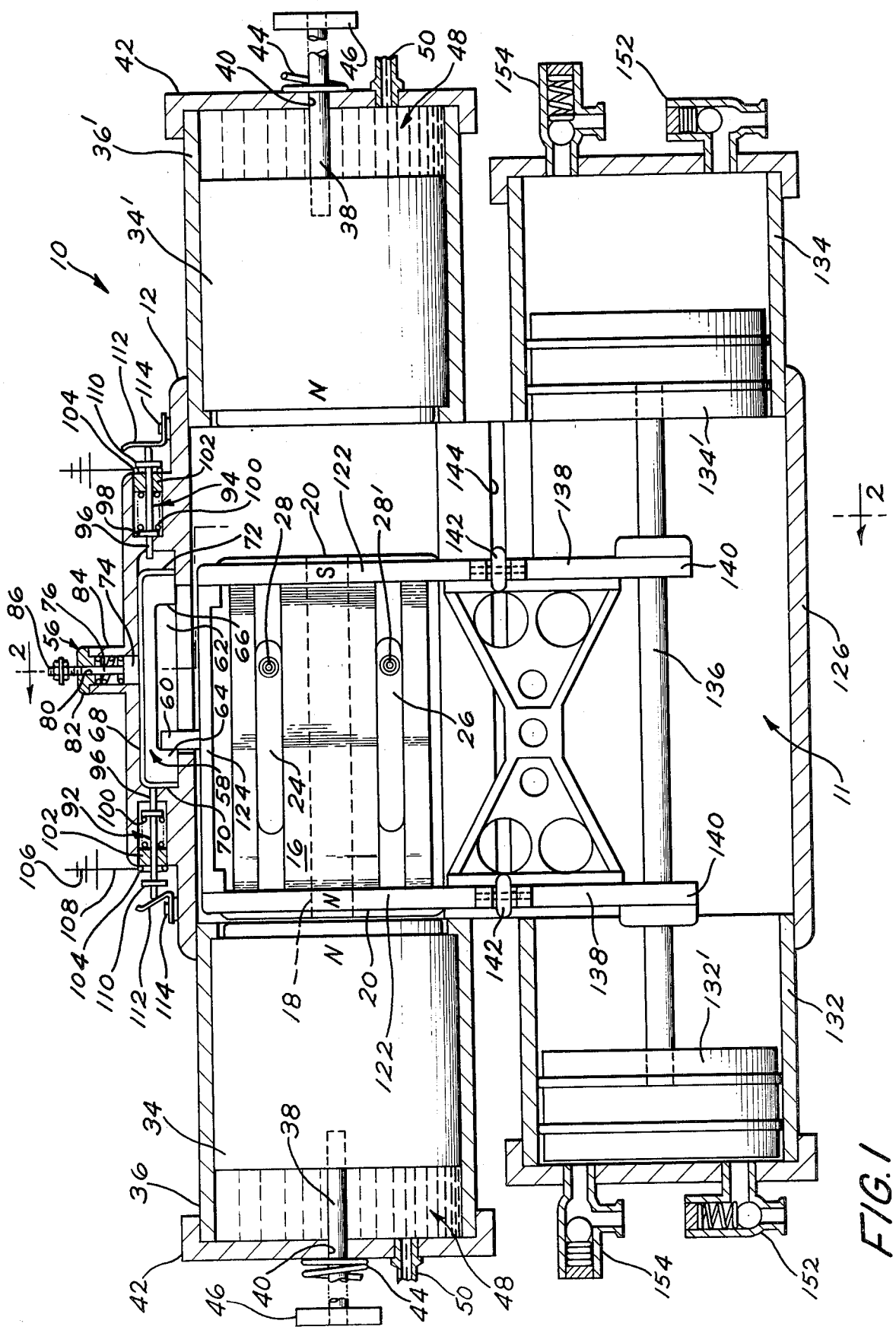
FIG. 1 is a front elevational view, partly in cross section, of the preferred embodiment of a reciprocating drive motor of the present invention, showing a double-acting piston pump positioned beneath the motor.
Figure 2:
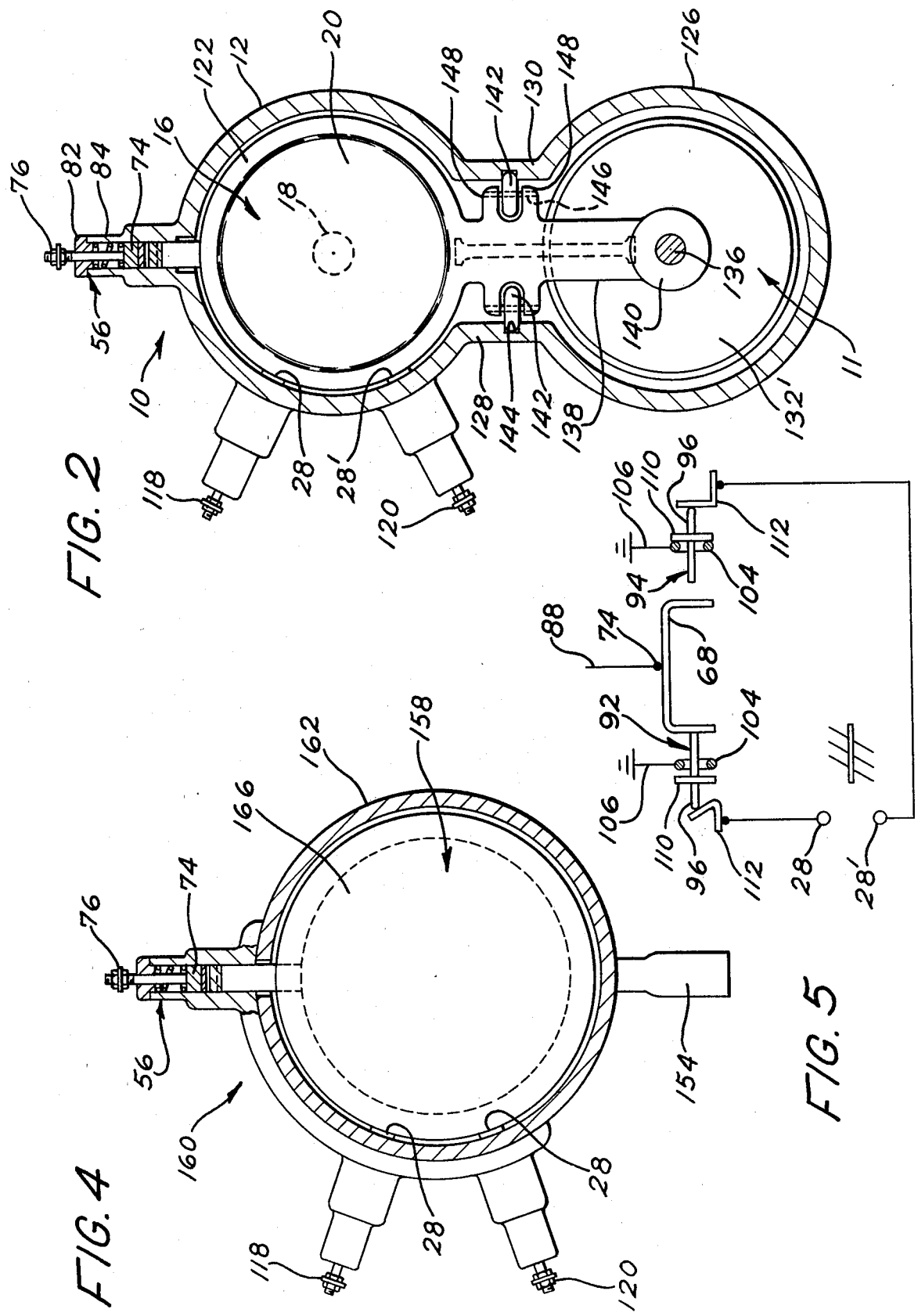
FIG. 2 is a transverse, cross-sectional, elevational view of the invention of FIG. 1 taken on the line 2—2 thereof.

Turning now to a consideration of the drawings, and in particular to the front, cross-sectional, elevational view of FIG. 1, there is shown a reciprocating drive motor 10 in combination with a double-acting piston pump 11. The motor has a motor housing 12 with guide means associated with the pump for supporting a movable electromagnet 16 for reciprocating motion. The electromagnet 16 has a soft iron core 18 extending through the longitudinal center thereof, and it is fitted with a soft iron contact plate 20 on each end of the iron core. These two contact plates 20, 20 serve as the opposite ends of the electromagnet 16. A coil of insulated wire 22 is wound around the core 18 so that when an electric current is passed through the wire it will magnetize the core, with the two contact plates 20 being of opposite polarities, N and S. One end of the coil or wire 22 terminates at a copper slide conductor 24, while the other end of the coil of wire terminates at a second copper slide conductor 26. Associated with each slide conductor 24 and 26 is a spring-biased contact brush 28 which is mounted through the wall of the motor housing 12 and is pressed into sliding contact with the slide conductor, as is best seen in FIG. 2.

Associated with each contact plate 20 at the end of the electromagnet 16 is a strong permanent magnet 34 and 34' respectively that are adjustably mounted. Notice that the facing poles of the two permanent magnets 34 and 34' are of the same polarity; namely, N and N. Each magnet 34 and 34' is formed as a cylindrical piston that is mounted in a mating hydraulic cylinder 36 and 36' respectively. The rear portion of each magnet 34 is fitted with a rod 38 which extends out through an opening 40 in the cylinder head 42 of the cylinder 36. The outer end of the magnet rod 38 is supplied with a helical compression spring 44, which is held in place by a nut 46 that is threaded onto the free end of the rod 38. Thus, the natural tendency of the compression springs 44 is to force the magnets 34 and 34' away from the electromagnet 16. This force of the compression spring 44 is resisted by a hydraulic fluid 48 under pressure, which is introduced into the cylinders 36 and 36' through a hydraulic fitting 50 to control the speed of reciprocating of the electromagnet 16.

A very important use of the present invention is for this reciprocating drive motor 10 and piston pump 11 to be used as the propulsion system for an electric automobile, truck, or other vehicle. In order to control the speed of the vehicle, the hydraulic fluid 48 under pressure would be introduced into or withdrawn from the cylinder 36 and 36' so as to shift the position of the permanent magnets 34 and 34' respectively, and thereby control the strength of the magnetic field acting on the electromagnet 16. In order to reduce the speed of reciprocation, it is necessary to reduce the strength of the magnetic field acting on the electromagnet 16. This can be accomplished by bleeding the hydraulic fluid 48 from the cylinders 36 and 36' so that the force of the springs 44 would shift each permanent magnet 34 and 34' away from the electromagnet 16. In a similar manner, the speed of reciprocation can be increased by increasing the strength of the magnetic field by forcing more hydraulic fluid 48 into the cylinder 36 to force the magnets 34 and 34' toward the electromagnet 16, as is best shown in FIG. 1.

It should be understood by those skilled in this art that the permanent magnets 34 and 34' may be fixed in place, so as to render the motor a constant speed motor or air compressor.

Electrical switching means 56 is located in proximity to the reciprocating electromagnet 16 for automatically reversing the flow of current within the coil 22 of the electromagnet near the end of each stroke of the electromagnet, so as to reverse the direction of sliding movement of the electromagnet. Looking at FIG. 1, the electromagnet 16 is at the left end of its stroke. A transfer slide member 58 is mounted within the side wall of the motor housing 12 so as to be able to reciprocate back and forth to a limited amount due to a lost-motion connection with the electromagnet 16 by means of a slide shifter member 60 that is formed as an integral part of the electromagnet 16. The shifter member 60 is not in engagement with the slide member 58 at all times. The slide member 58 has an elongated recess 62 on its underside in which the shifter member 60 operates. This elongated recess 62 has two opposite end walls, 64 and 66, which are adapted to be engaged by the shifter member 60 near the end of each stroke of the electromagnet for carrying the slide member 58, along with the electromagnet for a limited amount measured in a fraction of an inch. This transfer slide member 58 is fitted with a conductive strip 68, which extends along the top side of the slide member as well as down across each end of the slide member, as at 70 and 72 respectively. Associated with this conductive strip 68 is a spring-biased contact brush 74, which extends out through the wall of the motor housing 12 and is capable of delivering electrical current to the conductive strip 68. This contact brush 74 is fitted with a stem 76 which is supplied with a compression spring 78. This stem 76 has a sliding fit in an opening 80 of a removable cap 82 which serves to hold the brush and spring within the brush housing 84. The free end of the brush stem 76 is threaded, as at 86, to receive a nut 87 and serve as a terminal so that an electrical lead wire 88 may be joined thereto to bring in a supply of direct current.

Figure 3:
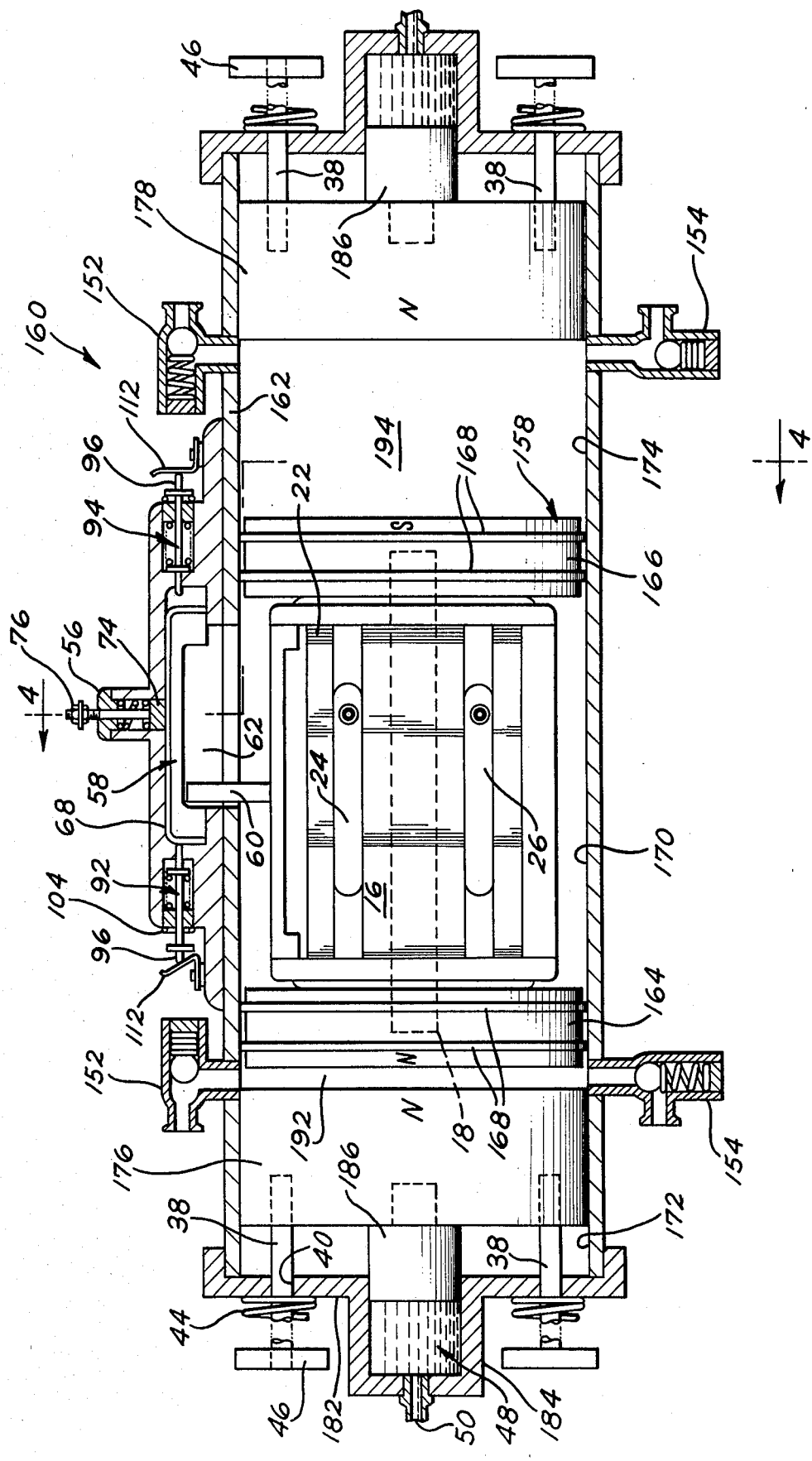
FIG. 3 is a front elevational view, partly in cross section, of a second modification of the present invention wherein a double-acting piston pump is integrated within the housing of the reciprocating drive motor, there being a piston mounted on each end of the sliding electromagnet and fitted within an operating fluid cylinder that is interposed between the electromagnet and the permanent magnets, where the pistons also serve as the guide means for supporting the movable electromagnet for reciprocating motion.

FIG. 5 is a schematic circuit diagram for the reciprocating electromagnet 16 of FIGS. 1 and 3, where the same reference numerals are used throughout.

One limit switch 92 is positioned at the left side of the transfer slide member 58, and a second limit switch 94 is positioned at the right side of the slide member. Each limit switch 92 and 94 includes a movable contact 96 that is mounted for limited sliding movement through the wall of the motor housing 12. Each movable contact 96 has a shoulder 98 which serves as a seat for a compression spring 100. The other end of the spring 100 is confined by a removable plug 102 that also serves as a support bearing for the sliding action of the movable contact 96. The outer end of this plug 102 includes a ground washer 104, which is electrically connected to ground 106 by lead wire 108. The outer end of the movable contact 96 includes a contact pad 110 for engagement with the ground washer 104 when the transfer slide member 58 is out of contact with the movable contact 96, as is seen with the right-hand limit switch 94 in FIG. 1. A flexible spring contact member 112 is mounted to the motor housing 12, as at 114, so as to be in constant engagement with the outer end of each movable contact 96. An electrical lead wire (not shown) would connect the mounting terminal 114 for the spring contact member 112 of the left-hand limit switch 92 to a spring-biased contact brush 28 for making wiping electrical contact with the copper slide conductor 24 of the electromagnet 16. In a similar manner, the mounting terminal 114 of the right-hand limit switch 94 would be connected by an insulated lead wire (not shown) to a spring-biased contact brush 28' for making electrical contact with the copper slide conductor 26 of the electromagnet. It should be noted that these two contact brushes, 28 and 28', function in a manner similar to the contact brush 74 that has a wiping engagement with the conductive strip 68 of the transfer slide member 58.

The movable electromagnet 16 of FIG. 1 is shown at the left end of its stroke. The transfer slide member 58 has also been forced to the left by the slide shifter member 60; thus, closing a circuit from the contact brush 74 between the conductive strip 68 and the movable contact 96 of the left-hand limit switch 92, while at the same time breaking the ground connection on that left side between the contact pad 110 and the ground washer 104. This transfer slide member action creates the opposite action in the right-hand limit switch 94 where the contact pad 110 closes a circuit with the ground washer 104 while the circuit is broken between the movable contact 96 of the right-hand limit switch 94 and the conductive strip 68. Thus, the flow of current in the electromagnet 16 is reversed, thus creating a north pole N on the left side of the electromagnet, and a south pole S on the right side. This north pole N on the left side of the electromagnet will repel the north pole N of the permanent magnet 34 at the left side. Moreover, the south pole S on the right side of the electromagnet will be attracted to the north pole N of the permanent magnet 34' at the right end of the motor. These forces will cause the electromagnet 16 to shift to the right side of its stroke, and the slide shifter member 60 will pick up the transfer slide member 58 near the end of its stroke, thereby closing a circuit between the conductive strip 68 and the movable contact 96 of the right-hand limit switch 94. At the same time, this will break the circuit to ground of the right-hand limit switch 94 between the contact pad 110 and the ground washer 104. Moreover, the spring 100 of the left-hand limit switch 92 will force the movable contact 96 to move to the right until the contact pad 110 closes a circuit with the ground washer 104. These actions will reverse the flow of current in the coil of the electromagnet 16; thus, changing poles from south to north on the right side of the electromagnet, and from north to south on the left side of the electromagnet; thus, forcing the electromagnet 16 to shift back to the left end of its stroke and starting a new cycle.

Behind each soft iron contact plate 20 is an insulating support plate 122. These two support plates 122, 122 are joined at the top of the motor by an insulating connecting plate 124. It is this connecting plate 124 that supports the slide shifter member 60, which is likewise of insulating material. Looking at FIG. 2, it will be seen that the insulating support plate 122 is generally circular in nature so as to fit within the cylindrical cavity of the motor housing 12 that encompasses the electromagnet 16. Notice, also in FIG. 2, that the combined motor 10 and pump 11 have a FIG. 8 configuration in transverse cross section. The upper cylindrical half consists of the motor housing 12, while the lower cylindrical half is a pump housing 126. These two housings, 12 and 126, are joined together by a pair of horizontally spaced vertical walls, 128 and 130.

As is seen in FIG. 1, the pump housing 126 includes a left-hand cylinder 132, a right-hand cylinder 134, and opposing pistons 132' and 134' respectively that are supported on the opposite ends of a common connecting rod 136.

Looking back at FIG. 2, the insulating support plate 122 is shown with a lower vertical column 138, which extends down between the two vertical walls 128 and 130 and is supported on the connecting rod 136 by means of bearings 140. Thus, it will be understood that the weight of the movable electromagnet 16 is carried by means of the two insulating support plates 122 through the vertical columns 138 to the connecting rod 136 and then through the two pistons, 132' and 134', to the opposing cylinders 132 and 134 of the pump housing 126.

Some means must be provided for centering the electromagnet 16 within the motor housing 12. This is accomplished, as is best seen in FIG. 2, by providing roller bearings 142 on each side of the vertical column 138 to operate within a horizontal track 144 on the inner surface of each vertical wall 128 and 130. Each roller bearing 142 has a vertical shaft 146 that is supported in a pair of vertically spaced bearings 148.

Each pump cylinder 132 and 134 has an intake ball valve 152 and a discharge ball valve 154. Hence, when the electromagnet 16 is moving from right to left, it carries with it the two pistons, 132' and 134'. The compression stroke of the piston 132' causes the discharge ball valve 154 of the cylinder 132 to open, as is shown in FIG. 1. At the same time, the suction stroke of the piston 134' causes the intake ball valve 152 to open for the cylinder 134. This pump 11, which is associated with the reciprocating electrical motor 10, may be either an air compressor or a fluid pump for driving a turbine (not shown) that may serve as the propulsion system for an electric operated vehicle, such as a passenger automobile, a light-duty delivery truck, a golf cart, or fork truck, or the like.

FIG. 3 shows a second modification of the present invention wherein a double-acting piston pump 158 is integrated within the housing of a reciprocating drive motor 160. In order to simplify the description of this second modification, the same reference numerals for the same elements will be used for the second modification as in the first modification if the parts or elements in both modifications are identical or generally similar. This reciprocating drive motor 160 has a motor housing 162 which supports adjacent its center a movable electromagnet 16 for reciprocating motion. This electromagnet 16 has a soft iron core 18 extending through the center thereof, but it is extended at each end to form a piston rod that carries a piston 164 on the left end of the electromagnet and a piston 166 on the right end. These two pistons 164 and 166 take the place of the two pistons 132' and 134' respectively of the first modification of FIG. 1. Moreover, these two pistons 164 and 166 are of magnetic material to serve the same purpose as the soft iron contact plates 20 of the first modification. These two pistons, 164 and 166, fit snugly within the cylindrical bore 170 of the motor housing 162 so that no fluid passes between the periphery of the pistons and the interior surface of the motor cylinder so as to protect the electromagnet 16 from any danger of electrical failure. Piston rings 168 are shown mounted on each piston 164 and 166 to obtain a proper sealing action between the piston and its cylinder 170. Moreover, it should be understood that these two pistons 164 and 166 serve as the supporting means for the electromagnet 16 within the motor housing in place of the superstructure of elements 122, 138, and the connecting rod 136, and the pistons, 132' and 134', of the first modification.

Located beyond each end of the cylindrical bore 170 for the reciprocating electromagnet 16 is a cylinder 172 at the left side and cylinder 174 at the right side. Associated with each cylinder 172 and 174 is a strong permanent magnet 176 and 178 respectively. These two permanent magnets 176 and 178 function in a similar manner to the permanent magnets 34 and 34' of the first modification of FIG. 1, as will be understood by those skilled in this art.

In order to reduce the amount of hydraulic fluid 48 needed to control the position of the permanent magnets 176 and 178, the cylinder head or end wall 182 is enlarged with a crown or a central cylindrical enlargement 184 for receiving a piston-like extension that is mounted on the outer side of each permanent magnet 176 and 178. A hydraulic fitting 50 is mounted in the end of the central cylindrical enlargement 184 so as to allow the amount of hydraulic fluid 48 in this miniature cylinder to be adjusted in order to adjust the position of the permanent magnets 176 and 178. Notice that each permanent magnet 176 and 178 is provided with a pair of rods 38 which extend through suitable openings 40 within the cylinder head 182 so that a compression spring 44 may be fitted over the outer end of the rod 38 and held in place by a nut 46.

The electrical circuitry and switching means for the movable electromagnet 16 of this second modification of FIG. 3 is substantially the same as that for the first modification of FIG. 1, therefore, no further explanation is deemed necessary.

Interposed between the left-hand piston 164 and the left-hand permanent magnet 176 is a fluid cylinder 192. This fluid cylinder 192 is furnished with an intake ball valve 152 and a discharge ball valve 154 to function in the same manner as the intake and discharge valves 152 and 154 of the first modification of FIG. 1.

Similarly, there is a fluid cylinder 194 interposed between the right-hand piston 166 and the right-hand permanent magnet 178. This fluid cylinder 194 is also furnished with an intake ball valve 152 and a discharge ball valve 154.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:
1. In a reciprocating drive motor comprising:
  a. a housing having guide means for supporting a movable electromagnet for reciprocating motion, the opposite ends of the electromagnet being of opposite polarities;
  b. electrical circuit means for energizing the electromagnet with alternate current flows to obtain alternate polarities of the electromagnetic field surrounding the electromagnet;
  c. a permanent magnet means positioned at a spaced distance at each end of the stroke of the movable electromagnet for creating both a strong magnetic field attraction force between the electromagnet and one of the permanent magnet means and a strong magnetic field repulsion force between the electromagnet and the opposite permanent magnet means, the same poles of the two permanent magnet means being positioned to face each other and being aligned with the adjacent end of the electromagnet;
  d. an electrical switching means operated by the position of the electromagnet at each end of its stroke for reversing the flow of current within the electromagnet so as to reverse the polarity of the opposite ends of the electromagnet and thereby reverse the magnetic field forces between the electromagnet and the pair of permanent magnet means for reversing the direction of movement of the electromagnet within the motor housing to produce the reciprocating motion of the electromagnet;
  e. a driven means actuated by the reciprocating motion of the electromagnet for producing work;
  f. the said pair of permanent magnet means being adapted to be adjustably mounted within the housing toward or away from the opposite ends of the electromagnet so as to be able to adjust the magnetic field force acting upon the electromagnet, and hence the speed of the motor, depending upon the distance separating the two adjustable permanent magnet means from the adjacent end of the electromagnet at the ends of its stroke.

2. The invention as recited in claim 1 wherein each said adjustable permanent magnet means is fitted to act as a piston within a hydraulic cylinder, and spring-biasing means acting between each permanent magnet means and its cylinder for urging the permanent magnet means away from the electromagnet, and hydraulic fluid means under pressure filling the cylinder behind each permanent magnet means for controlling the distance of the permanent magnet means away from the adjacent end of the electromagnet.

3. The invention as recited in claim 2 wherein each hydraulic cylinder is provided with a fluid entry means for changing the amount of fluid within the cylinders, and thus the displacement of the permanent magnet means within the cylinders.

4. The invention as recited in claim 3 wherein the said spring-biasing means for each permanent magnet means comprises a rod means attached to the permanent magnet means and extending longitudinally of the cylinder and out through an opening in an end wall of the cylinder, and a compression spring member fitted onto the portion of the rod that is outside of the cylinder, and a spring washer fastened onto the rod and seated against the spring for urging the permanent magnet means toward the said end wall and away from the electromagnet.

5. The invention as recited in claim 1 wherein the said electrical circuit means and the electrical switching means comprise a source of DC voltage connected to a spring-biased electrical brush means that is mounted through one wall of the housing adjacent the electromagnet, and a slide member mounted for reciprocating movement within the housing, said slide member having an electrical conductive surface in wiping engagement with the said electrical brush means, and a spring-biased electrical switch contact member at each end of the stroke of the said slide member for making electrical engagement with the conductive surface of the slide member when the slide member reaches the respective end of its stroke, the said movable electromagnet including a shift lever that is engageable with the slide member in a lost-motion connection to shift the slide member to its alternate position near the final stages of movement of the electromagnet reaching the end of its stroke, the electromagnet including a pair of longitudinal conductive strips on the exterior thereof that are joined to the opposite ends of the electrical windings of the electromagnet, and the housing including a pair of spring-biased brush members for making wiping engagement with the said pair of conductive strips during the reciprocating movement of the electromagnet, and circuit means joining each of said spring-biased electrical switch contact members with one of the said pair of spring-biased brush members, while each of said spring-biased electrical switch contact members engage a grounded circuit means respectively when the slide member is out of contact with the electrical switch contact means.

6. The invention as recited in claim 1 wherein the said driven means is a double-acting piston pump having an elongated pump housing with a pair of oppositely disposed cylinders adjacent the pair of hydraulic cylinders of the motor housing, each pump cylinder being fitted with a piston, and a common piston rod joining the two pistons, the said electromagnet having a brace member adjacent each end thereof that is joined to the piston rod of the pump, and a pair of parallel guide rails positioned one at each side of the pair of brace members, the brace members supporting roller means for cooperation with the guide rails to guide the electromagnet during its reciprocating movement.

7. The invention as recited in claim 1, wherein the said driven means is a double-acting piston pump that is integrated within the reciprocating drive motor housing, said piston pump comprising a piston mounted on each end of the electromagnet and fitted within an operating cylinder at each end of the electromagnet wherein the said pistons also serve as the said guide means for supporting the movable electromagnet for reciprocating motion, each of the said permanent magnet means also being fitted to act as a piston within a cylinder, and biasing means acting on the permanent magnet means for urging the permanent magnet means away from the electromagnet, and adjustable means for controlling the distance of the permanent magnet means away from the adjacent piston of the electromagnet, and inlet and exhaust valve means associated with each of said operating cylinders for controlling the flow of a working medium therein.

8. In a reciprocating drive motor comprising:
 a. an elongated cylindrical motor housing having a piston-like permanent magnet adjustably mounted adjacent each end of the cylindrical housing, the same poles of the two permanent magnets being positioned to face each other;
 b. a movable electromagnet positioned between the two spaced permanent magnets and guided for reciprocating movement therebetween, the opposite ends of the electromagnet being of opposite polarities;
 c. electrical circuit means for energizing the reciprocating electromagnet;
 d. automatic electrical switching means for reversing the flow of current within the electromagnet at each end of its reciprocating stroke so as to reverse the polarity of the opposite ends of the electromagnet and thus reverse its direction of movement;
 e. and driven means coupled to the reciprocating electromagnet for producing work;
 f. a fluid medium acting upon each piston-like permanent magnet for changing the distance between the pair of permanent magnets for changing the speed of the motor by changing the speed of reciprocation of the electromagnet.

9. The invention as recited in claim 8, wherein each piston-like permanent magnet is spring-biased away from the opposite magnet, and where the said fluid medium is introduced into the said cylindrical housing behind each magnet for opposing the action of the said spring bias so as to obtain a quick control response depending upon the volume of the fluid medium within the cylinder.

10. The invention as recited in claim 9, wherein the said reciprocating electromagnet has a longitudinal soft iron core with a circular soft iron contact plate attached to each opposite end of the core, where the contact plate is about the same size as the adjoining face of the adjacent permanent magnet.

11. The invention as recited in claim 8, wherein the said automatic electrical switching means comprises a spring-biased contact brush acting upon a transfer slide member that travels between a pair of limit switch means, the electromagnet having a slide shifter member that has a lost-motion connection with the transfer slide member for reversing the said slide member as the electromagnet reaches each end of its reciprocating stroke.

12. The invention as recited in claim 8, wherein the said driven means is a double-acting piston pump comprising an elongated cylindrical pump housing arranged generally parallel to the said motor housing, and pump walls joined to the motor housing in the vicinity of the centrally-mounted reciprocating electromagnet, each end of the pump supporting a piston therein, and a connecting rod joined between the two pistons, and both intake and discharge valve means for each pump cylinder and a support plate means attached to the said electromagnet and extending from the motor housing to the pump housing for connection to the said connecting rod, whereby the electromagnet is supported from the said connecting rod, and the said pistons of the pump move in unison with the electromagnet.

13. The invention as recited in claim 12, wherein the said support plate means includes roller bearing means on the opposite sides thereof in the vicinity of the said pump walls that are joined to the said motor housing for centering and guiding the reciprocating movement of the electromagnet.

14. The invention as recited in claim 10, wherein each end of the said iron core supports a piston thereon to form with the reciprocating electromagnet an integrated double-acting piston pump whereby a fluid medium is interposed in the cylindrical housing between each combination of piston and permanent magnet for control by the operation of the motor, and both intake and discharge valve means for each pump cylinder.

* * * * *